//patents.google.com

[19] United States Patent
Lundquist

[11] 3,860,250
[45] Jan. 14, 1975

[54] SEALING DEVICE FOR PREVENTION OF LEAKAGE BETWEEN CYLINDRICAL SURFACES
[75] Inventor: Ulf Rolfsson Lundquist, Mjolby, Sweden
[73] Assignee: Forenabe Fabriksverken, Eskilstuna, Sweden
[22] Filed: Sept. 4, 1973
[21] Appl. No.: 394,091

[30] Foreign Application Priority Data
Sept. 4, 1972  Sweden.............. 11401/72

[52] U.S. Cl. ............................................. 277/165
[51] Int. Cl............................................. F16j 15/24
[58] Field of Search.............. 277/165; 285/DIG. 19; 287/1.5

[56] References Cited
UNITED STATES PATENTS
2,931,673  4/1960  Gondek ............................ 277/165

Primary Examiner—Harry N. Haroian
Assistant Examiner—Robert I. Smith
Attorney, Agent, or Firm—Laurence R. Brown

[57] ABSTRACT

A sealing device for a shaft or cylinder to prevent axial leakage at high pressure comprises a groove in which a sealing ring is contained. The sealing ring is a compound element having a deformable O ring in the bottom of the groove and a metal ring nearly the axial length of the groove in contact with the O ring and faced with a polymer ring to contact the cylindrical surface. Gas under pressure enters the groove to hold the assembly toward the axial groove surface on the lower pressure side.

1 Claim, 1 Drawing Figure

PATENTED JAN 14 1975 3,860,250
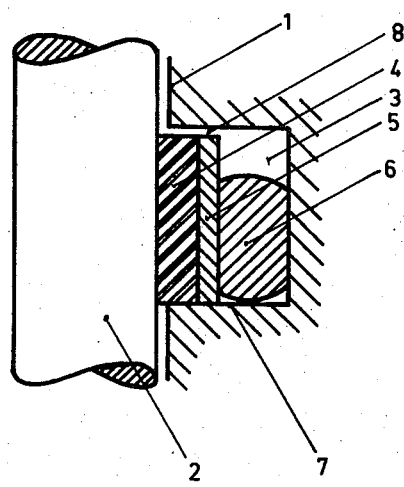

SEALING DEVICE FOR PREVENTION OF LEAKAGE BETWEEN CYLINDRICAL SURFACES

The present invention relates to a sealing device for prevention of leakage between cylindrical surfaces performing axial relative movements and of the type comprising a sealing ring mounted in a groove in one of said surfaces and engaging the other surface, the said sealing ring consisting of parts of polymeric material and metal overlapping each other in axial direction, an elastically deformable material being provided in said groove between said ring and an adjacent wall in the groove.

Sealing devices of this type are provided e g in engines or pumps with the object of preventing liquid or gas — often under a high pressure — from leaking out from said engines or pumps.

It is sometimes desirable to obtain an almost complete seal against leakage and in such cases the necessary high contact pressure between the sealing surfaces and the friction heat developed will normally make necessary a supply of heat absorbing lubricating oil.

The object of the present invention is to provide a device of the type referred to above which is a simple and cheap design and which does not need supply of lubricating oil. This is obtained by the features of the patent claim.

The invention will be described below reference being made to the drawing showing an axial section of a sealing device according to the invention.

The wall 1 of an opening in a cylinder for a piston rod 2 is provided with an annular groove 3 having a rectangular cross section. In said groove is located a ring 4 made of polymeric material, preferably poly tetra flourethene, said ring having rectangular cross section and engaging the piston rod 2.

The polymer ring 4 is surrounded by a metal ring 5 secured to the ring 3 and also having rectangular cross section. The space between the metal ring and the cylindrical wall of the groove contains a sealing element 6, preferably an O-ring. The polymer ring and the metal ring is of the same axial length, which is somewhat less than the axial length of the groove. With the exception of the part of the polymer ring which is most close to the piston rod, the metal ring and the polymer ring are abutting a lower shoulder surface 7 limiting the groove in the axial direction towards the lowest surrounding pressure. Thus an opening 8 is established between the upper radially directed surface limiting the groove and the polymer and metal rings. Fluid or gas under pressure may thus pass to the groove 3 between its cylindrical wall and the metal ring. The polymer ring 4 may be glued to the inner surface of the metal ring 5 or it may be formed as a lining on the inside of the metal ring.

Due to the arrangement according to the invention the wear of the polymer ring 4 is counteracted by the elasticity of the metal ring 5. The stresses occurring in the metal ring due to the external pressure will counteract said outer pressure. Thus the contact pressure against the piston rod will decrease with increasing wear on the polymer ring. After some time a state is obtained in which the PV-factor (the contact pressure multiplied with the speed) for the sealing material is reached. A calculation of the necessary thickness of material of the metal ring will show that it is so small that it will be impossible to mount the polymer ring in a groove in the metal ring. The sealing device according to the invention is adapted to seal against leakage of liquids or gas at high pressures. In case of sealing against gas leakage it will not be necessary to supply lubrication oil, because the friction heat developed will be carried off by contact between the metal ring 5 and the surface 7.

I claim:

1. A sealing device for prevention of leakage between cylindrical surfaces performing axial relative movements and of the type comprising a sealing ring mounted in a groove in one of said surfaces and engaging the other surface, the said sealing ring consisting of parts of polymeric material and metal of equal extent in the axial direction, an elastically deformable material being provided in said groove between said metal and the bottom wall of the groove, characterized in that the sealing ring consists of an inner, cylindric polymer part and an elastic metal ring surrounding said part and being secured thereto, the sealing ring having an axial length which is somewhat less than the axial length of the groove, the sealing ring abutting a radially extending surface limiting the groove in the axial direction against the lowest surrounding pressure.

* * * * *